UNITED STATES PATENT OFFICE.

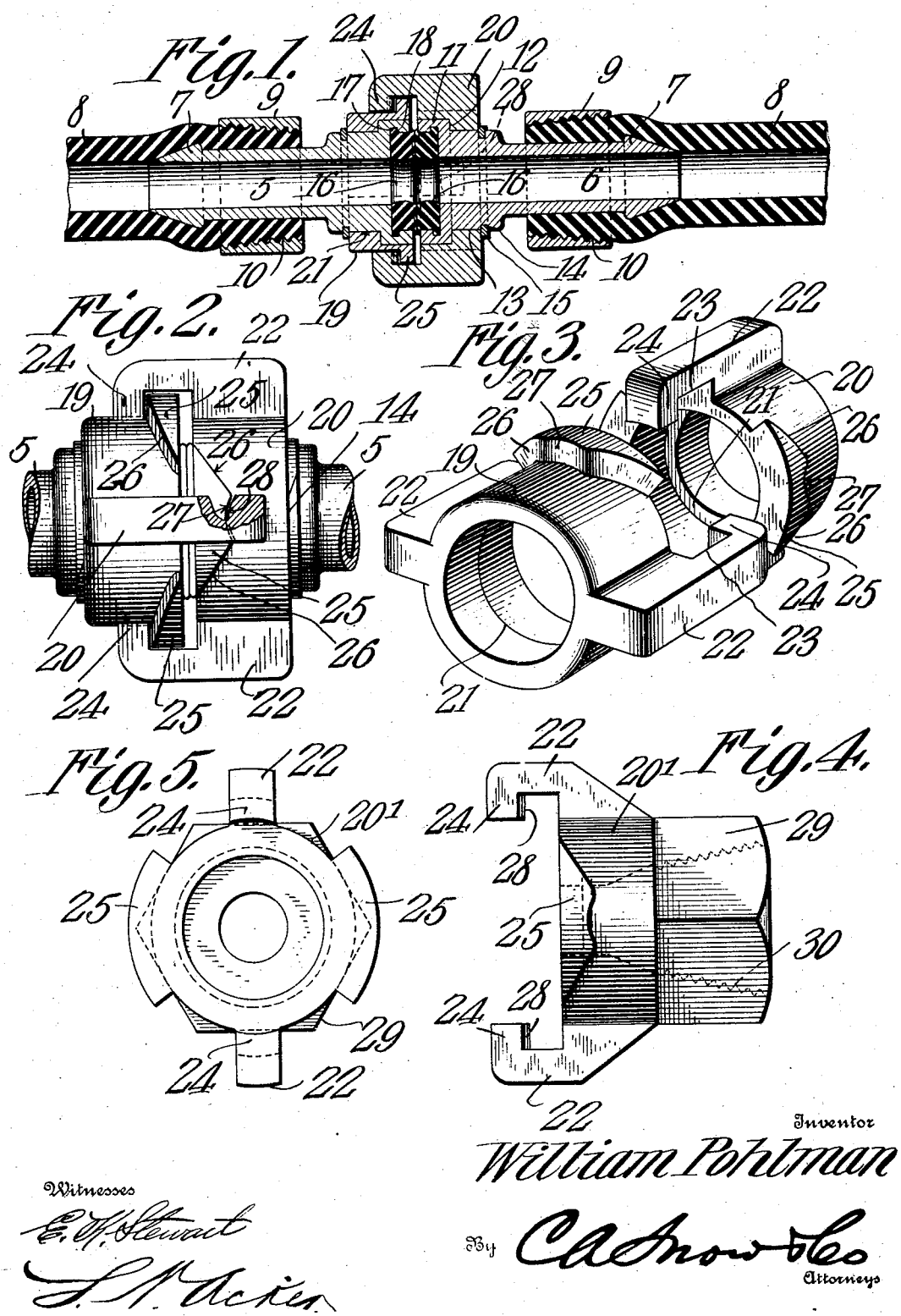

WILLIAM POHLMAN, OF MIDDLETOWN, NEW YORK.

COUPLING FOR HOSE AND PIPE.

No. 894,900.      Specification of Letters Patent.      Patented Aug. 4, 1908.

Application filed October 31, 1907. Serial No. 400,058.

*To all whom it may concern:*

Be it known that I, WILLIAM POHLMAN, a citizen of the United States, residing at Middletown, in the county of Orange and State of New York, have invented a new and useful Coupling for Hose and Pipe, of which the following is a specification.

This invention relates to couplings for uniting adjacent sections of air, steam or other fluid conductors and has for its object to provide a strong, durable and thoroughly efficient device of this character by means of which the adjacent ends of a pipe or hose may be conveniently and expeditiously coupled.

A further object of the invention is to provide a coupling including interchangeable members mounted for rotation on the adjacent ends of the pipe or hose sections to be united and provided with interlocking parts.

A further object is to provide a packing or gasket for preventing the escape of fluid at the juncture of the pipe sections, and means for locking the gasket against accidental displacement.

A still further object of the invention is generally to improve this class of devices so as to increase their utility, durability and efficiency.

Further object and advantages will appear in the following description, it being understood that various changes in form, proportions and minor details of construction may be resorted to within the scope of the appended claims.

In the accompanying drawings forming a part of this specification: Figure 1 is a longitudinal sectional view of a pipe or hose coupling constructed in accordance with my invention. Fig. 2 is a side elevation of the same partly in section. Fig. 3 is a perspective view of the mating members detached. Fig. 4 is a side elevation illustrating a modified form of the invention. Fig. 5 is a front elevation of Fig. 4.

Similar numerals of reference indicate corresponding parts in all of the figures of the drawings.

The improved coupling forming the subject matter of the present invention includes a pair of co-acting tubular sections 5 and 6, each having one end thereof provided with an annular enlargement 7 the walls of which are inclined or beveled for engagement with the interior walls of the flexible hose or conductor 8.

The hose 8 is rigidly combined with the adjacent tubular section by means of a clamping ring or collar 9 having its interior walls inclined and corrugated circumferentially at 10 for engagement with the exterior walls of the adjacent hose or conductor whereby when the collar is positioned on the conductor and rotated in the direction of the enlargement 7 the hose 8 will be securely clamped in engagement with said tubular section so as to effectually prevent accidental displacement of the same.

The inner end of each tubular member is provided with an enlarged head 11 defining an annular stop shoulder 12 and a smooth bearing surface 13, there being an annular groove 14 formed in each bearing surface for the reception of a split ring 15.

The heads 11 are provided with seating recesses for the reception of a packing or gasket 16 preferably formed of rubber or other yieldable material capable of being slightly compressed when the tubular sections 5 and 6 are forced together, said gaskets being provided with lateral retaining flanges 17 which engage correspondingly shaped grooves 18 communicating with the gasket receiving recesses and which serve to prevent accidental displacement of the gaskets when the coupling members are disconnected.

Mounted for rotation on the bearing surfaces 13 of the tubular sections are mating members 19 and 20 each provided with a depending flange 21 which is interposed between the adjacent shoulder 12 and split ring 14, as shown, thereby to prevent longitudinal movement of said mating members.

Each mating member is provided with a longitudinal strengthening rib 22 which projects longitudinally beyond the forward end of said member and is provided with a transverse recess 23 defining an over-hanging hook 24 for engagement with a locking lug or projection 25 on the mating section.

The lugs 25 are disposed at substantially right angles to the reinforcing ribs 22 and are each provided with inclined faces 26, there being a depression 27 formed at the juncture of the inclined faces 26 for the reception of the correspondingly curved surface 28 of the adjacent hook 24.

It will thus be seen that when the tubular members 5 and 6 are brought together and the mating members 19 and 20 partially rotated the hook 24 of one member will ride over the inclined face 26 of the locking lug of the mating member until the curved portion 23 of the hook registers with the recess 27 in said locking lug, when the members are locked against further rotation. As the hooks 24 ride over the inclined faces of the locking lugs 25 the tubular extensions 5 and 6 will be forced together thus compressing the gasket 16 and effectually preventing escape of air, steam or other fluid at the juncture of said tubular sections.

In order to uncouple the pipe sections it is merely necessary to exert a slight lateral pressure on the members 19 and 20 when the hooks will become disengaged from the seating recesses or depressions 27 and thus permit the sections to be readily disconnected.

In Figs. 4 and 5 of the drawings there is illustrated a modified form of the invention in which one end of each locking member 20' is formed with an angular extension 29, the interior walls of which are threaded at 30 for attachment to the correspondingly threaded end of a pipe or similar conductor, the construction and operation of the device being otherwise similar to that shown in Fig. 1 of the drawings.

From the foregoing description it is thought that the construction and operation of the device will be readily understood by those skilled in the art and further description thereof is deemed unnecessary.

Having thus described the invention what is claimed is:

1. A coupling including co-acting tubular sections each provided with an annular stop shoulder and a circumferential groove, a gasket interposed between said sections, mating members mounted for rotation on the exterior walls of the tubular sections and bearing against the stop shoulders, said members each being provided with a locking lug having oppositely disposed inclined faces, there being a depression formed at the juncture of the inclined faces of each locking lug, split rings seated in the circumferential grooves and longitudinal ribs formed on each member and provided with transverse recesses defining over-hanging hooks adapted to engage the depressions in the locking lugs of the mating section.

2. A coupling including co-acting tubular sections each provided with an annular stop shoulder and a circumferential groove disposed in spaced relation to the stop shoulder, a gasket interposed between said sections, mating members mounted for rotation on the exterior walls of the tubular sections and bearing against the stop shoulders, said members each being provided with oppositely disposed locking lugs having inclined faces, there being depressions formed in the lugs at the juncture of the inclined faces thereof, split rings seated in the circumferential grooves, and overhanging hooks projecting longitudinally from the inner ends of each member and provided with a curved bearing surface for engagement with the depressions in the adjacent locking lugs of the mating section for clamping the tubular sections in coupled position.

In testimony that I claim the foregoing as my own, I have hereto affixed my signature in the presence of two witnesses.

WILLIAM POHLMAN

Witnesses:
CHARLES H. BARTELS,
WALTER FUNNELL.